United States Patent
Kuenstner et al.

(10) Patent No.: US 10,947,893 B2
(45) Date of Patent: Mar. 16, 2021

(54) ADJUSTMENT MECHANISM FOR AN INLET FLOW SECTION OF A COMPRESSOR WHEEL OF A TURBOCHARGER

(71) Applicants: Volkswagen Aktiengesellschaft, Wolfsburg (DE); Garrett Transportation I Inc., Torrance, CA (US)

(72) Inventors: Marko Kuenstner, Rennau (DE); Petr Hasa, Slapanice (CZ); Tomas Kladensky, Brno (CZ)

(73) Assignees: Volkswagen Aktiengesellschaft, Wolfsburg (DE); Garrett Transportation I Inc., Torrance, CA (US)

( * ) Notice: Subject to any disclaimer, the term of this patent is extended or adjusted under 35 U.S.C. 154(b) by 0 days.

(21) Appl. No.: 16/674,436

(22) Filed: Nov. 5, 2019

(65) Prior Publication Data
US 2020/0141310 A1    May 7, 2020

(30) Foreign Application Priority Data

Nov. 5, 2018 (EP) .................................. 18204229

(51) Int. Cl.
*F02B 39/08* (2006.01)
*F02B 33/40* (2006.01)
(Continued)

(52) U.S. Cl.
CPC .............. *F02B 39/08* (2013.01); *F02B 33/40* (2013.01); *F04D 29/284* (2013.01); *F04D 29/287* (2013.01); *F04D 29/30* (2013.01)

(58) Field of Classification Search
CPC ........ F02B 33/40; F02B 37/225; F02B 37/24; F02B 39/08; F02C 6/12; F04D 25/024;
(Continued)

(56) References Cited

U.S. PATENT DOCUMENTS

| 3,787,022 A | 1/1974 | Wilcox |
| 2016/0123333 A1 | 5/2016 | Mohtar et al. |

(Continued)

FOREIGN PATENT DOCUMENTS

| DE | 102 24 051 A1 | 12/2003 |
| DE | 10 2004 003 206 A1 | 8/2005 |

(Continued)

OTHER PUBLICATIONS

Extended European Search Report for European Application No. 18204229.1 dated May 9, 2019—English translation.

*Primary Examiner* — Brandon D Lee
(74) *Attorney, Agent, or Firm* — Muncy, Geissler, Olds & Lowe, P.C.

(57) ABSTRACT

An adjustment mechanism for an air inlet flow section of a compressor wheel of a turbocharger. The adjustment mechanism defines a variable inlet diameter for an axial air flow to the compressor wheel. The adjustment mechanism has a unison ring and a plurality of vanes. An actuator is used for providing a first pivoting motion to the unison ring about a central axis and thereby providing a second pivoting motion to the plurality of vanes. At least one elastic biaser is arranged, such that it provides, upon the pivoting motion to the unison ring, a restoring force to the unison ring and/or the plurality of vanes. The pivoting motion of the vanes adjusts the inlet diameter of the axial air flow to the compressor wheel.

9 Claims, 5 Drawing Sheets

(51) Int. Cl.
*F04D 29/28* (2006.01)
*F04D 29/30* (2006.01)

(58) Field of Classification Search
CPC .. F04D 27/0253; F04D 29/284; F04D 29/287; F04D 29/30; F04D 29/4213; F04D 29/462; F04D 29/464
See application file for complete search history.

(56) References Cited

U.S. PATENT DOCUMENTS

| | | |
|---|---|---|
| 2016/0146099 A1 | 5/2016 | Mohtar et al. |
| 2016/0177956 A1 | 6/2016 | Mohtar et al. |

FOREIGN PATENT DOCUMENTS

| | | | |
|---|---|---|---|
| JP | S 63-130637 U | 8/1988 | |
| WO | WO 2014/173668 A1 | 10/2014 | |
| WO | WO 2018/200611 A1 | 11/2018 | |
| WO | WO-2018200611 A1 * | 11/2018 | ............ F02B 37/225 |

\* cited by examiner

ADJUSTMENT MECHANISM FOR AN INLET FLOW SECTION OF A COMPRESSOR WHEEL OF A TURBOCHARGER

This nonprovisional application claims priority under 35 U.S.C. § 119(a) to European Patent Application No. 18204229.1, which was filed in Germany on Nov. 5, 2018 and which is herein incorporated by reference.

BACKGROUND OF THE INVENTION

Field of the Invention

The invention relates to an adjustment mechanism for an inlet flow section of a compressor wheel of a turbocharger for defining a variable inlet.

Description of the Background Art

German Patent Application DE 10 2004 003 206 A1 relates to a compressor which is mounted in the intake tract of an internal combustion engine. A compressor wheel of the compressor is rotatably received in an axial compressor inlet channel. The compressor wheel compresses to an increased boost pressure the combustion air which is supplied to the axial compressor inlet channel from a combustion air channel through at least one axial air opening mounted upstream of the compressor wheel. The cross-section of the combustion air channel or the flow in the combustion air channel can be adjusted. At least one radial air opening is disposed in the opening area of said compressor inlet channel and has an adjustable cross-section of flow, thereby supplying combustion air and driving the compressor wheel. The cross-sections of flow of the axial air opening and the radial air opening can be adjusted by means of adjustable locking elements that can be actuated by means of at least one actuator. The compressor is additionally provided with a regulating device which, if the actuator is not operating or disabled, automatically brings the locking elements in a position in which the axial air opening and/or the radial air opening has a defined cross-section of flow.

German Patent Application DE 102 24 051 A1 relates to a mechanism for adjusting the setting of an exhaust turbo charger unit of a motor vehicle. The exhaust turbo charger has a setting motor in order to obtain at least a variable turbine geometry. The setting motor with a transmission moves the setting unit between two end positions. The transmission has levers linked together by swivel joints. The assembly has at least one spring to move the setting unit into a given position when the setting motor power supply is cut.

US patent application US 2016/0123333 discloses a centrifugal compressor for a turbocharger which includes an inlet-adjustment mechanism in an air inlet for the compressor. The inlet-adjustment mechanism is operable to move between an open position and a closed position in the air inlet. The inlet-adjustment mechanism includes an axially elongated ring. In the open position, the radially outer surface of the ring is spaced from a tapering inner surface of the air inlet so that air can flow in an annular passage between the tapering surface and the ring. In the closed position, the ring abuts the tapering surface to close off the annular passage, whereby the effective inlet diameter is then defined by the inner diameter of the ring at its trailing edge. Movement of the inlet-adjustment mechanism from the open position to the closed position is effective to shift the compressor's surge line to lower flow rates.

US patent application US 2016/0146099 discloses a centrifugal compressor for a turbocharger which includes an inlet-adjustment mechanism in an air inlet for the compressor, operable to move between an open position and a closed position in the air inlet. The inlet-adjustment mechanism includes a variable-geometry conical mechanism comprising a plurality of vanes that, in the closed position, collectively form a frusto-conical inlet member having a trailing edge inner diameter that is smaller than an inner diameter of the shroud surface of the compressor housing at the inducer portion of the compressor wheel such that an effective diameter of the air inlet at the inducer portion is determined by the trailing edge inner diameter of the variable-geometry conical mechanism. The vanes in the open position are pivoted radially outwardly so as to increase the trailing edge inner diameter of the inlet member and thereby increase the effective diameter of the air inlet at the inducer portion.

US patent application US 2016/0177956 discloses a centrifugal compressor for a turbocharger which includes an inlet-adjustment mechanism in an air inlet for the compressor, operable to move between an open position and a closed position in the air inlet. The inlet-adjustment mechanism includes a variable-geometry orifice actuated by a rotatable actuator ring. In the closed position, the orifice's inner diameter is smaller than that of a shroud surface of the compressor housing and therefore dictates the effective inlet diameter for the compressor. In the open position, the orifice no longer forms an inner diameter smaller than the shroud surface, so that the effective inlet diameter is determined by the shroud surface.

International Patent Application WO 2018/200611 A1 provides an adjusting mechanism for a compressor of a charging device for the variable changing of the cross section of a compressor inlet. The mechanism comprises an adjusting ring, a plurality of adjusting elements which are rotatably mounted and coupled to the adjusting ring, and a trimming device which defines an inlet cross section. The adjusting elements are coupled to the trimming device so that a movement of the adjusting elements causes an adjustment of the trimming device. The adjustment of the trimming device causes a change in the inlet cross section. There is no biasing of the trimming device with respect to the adjusting ring.

International Patent Application WO 2014/173668 A1 relates to an exhaust gas turbocharger for a combustion engine, in particular a diesel combustion engine. The turbocharger having a turbine, wherein the turbine has a turbine housing that forms an inlet channel upstream of a turbine rotor. The turbocharger forms an outlet channel downstream of the turbine rotor. The turbine provides a cross-sectional area in the outlet channel which be changed by means of an adjustment device. There is no biasing between the adjustment device and the wall elements, defining the cross-sectional area of the outlet channel.

U.S. Pat. No. 3,787,022 discloses an iris type check valve is provided having at least one matched pair of vanes which are actuated by a rotating plate to modify the size of the orifice and thus regulate flow of materials through the unit. The vanes are attached to a tensioner.

SUMMARY OF THE INVENTION

It is therefore an object of the present invention to provide an adjustment mechanism for an air inlet flow section of a compressor wheel of a turbocharger which has a reliable fail safe function for the vanes of the adjustment mechanism.

In an exemplary embodiment of the present invention, an adjustment mechanism for an air inlet flow section of a compressor wheel of a turbocharger is configured to define a variable inlet diameter for an axial air flow to the compressor wheel. The adjustment mechanism has a unison ring, which is arranged in the axial air flow prior to the compressor wheel. The adjustment mechanism further comprises a plurality of movable vanes. The vanes are mounted pivotable and are mechanically linked to the unison ring.

In an exemplary embodiment of the present invention, the adjustment mechanism also comprises an actuator for providing a first pivoting motion to the unison ring. The first pivoting motion takes place around a central axis of the adjustment mechanism and thereby provides a second pivoting motion to the plurality of vanes. At least one elastic biaser is arranged such that it provides, upon the first pivoting motion to the unison ring, a restoring force to the unison ring and/or the plurality of vanes.

An advantage of the adjustment mechanism according to the invention is that the restoring force for the vanes is available even at a failure of the actuator which positions the vanes during a proper operation. In case of a fault, for example caused by a malfunctioning actuator for the vanes, the restoring force enables that a damage of the turbo charger is avoided.

The at least one elastic biaser is attached to the unison ring and a housing of the turbocharger. The at least one elastic biaser can be, for example, a first spring. Upon rotation or the first pivoting motion of the unison ring, the elastic biaser, which is applied between the unison ring and the housing of the turbocharger, provides the restoring force for the unison ring. Consequently, the vanes are moved back into the initial position.

The at least one elastic biaser can be arranged between the unison ring and each of the plurality of vanes. The at least one elastic biaser can also be a second spring element. Upon rotation or the first pivoting motion of the unison ring, the elastic biaser, which is applied between the unison ring and each of the vanes, provides the restoring force for the vanes. The restoring force for the vanes is sufficiently large in order to move the unison ring as well into the initial position. Consequently, the vanes are moved back into the initial position.

The at least one elastic biaser can be attached to the unison ring and a housing of the turbocharger, and at least one of the at least one elastic biaser is arranged between the unison ring and each of the plurality of vanes. The at least one elastic biaser which connects the unison ring and the housing of the turbocharger, can be a first spring element. The elastic biaser connecting each vane to the unison ring may be a second spring element. Together, the first spring element and the second spring element provide sufficient restoring force to move the plurality of vanes and the unison ring back into the initial position.

The initial position is defined by the not powered actuator, which means that the vanes are in a position that the inlet diameter of the air inlet flow section is at a maximal size. As a consequence the air is not guided by the vanes to the compressor wheel.

Each vane can be mounted pivotably about a corresponding pivot point and each vane can be mechanically linked to an inner circumference of the unison ring. In an exemplary embodiment, the mechanical link of each vane and the unison ring is provided by a corresponding nose of each vane. Each nose reaches in a corresponding recess formed at the inner circumference of the unison ring.

The present invention further provides a turbocharger having an adjustment mechanism.

Additionally, the present invention provides a vehicle with an internal combustion engine having a turbocharger, which is equipped with an adjustment mechanism.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
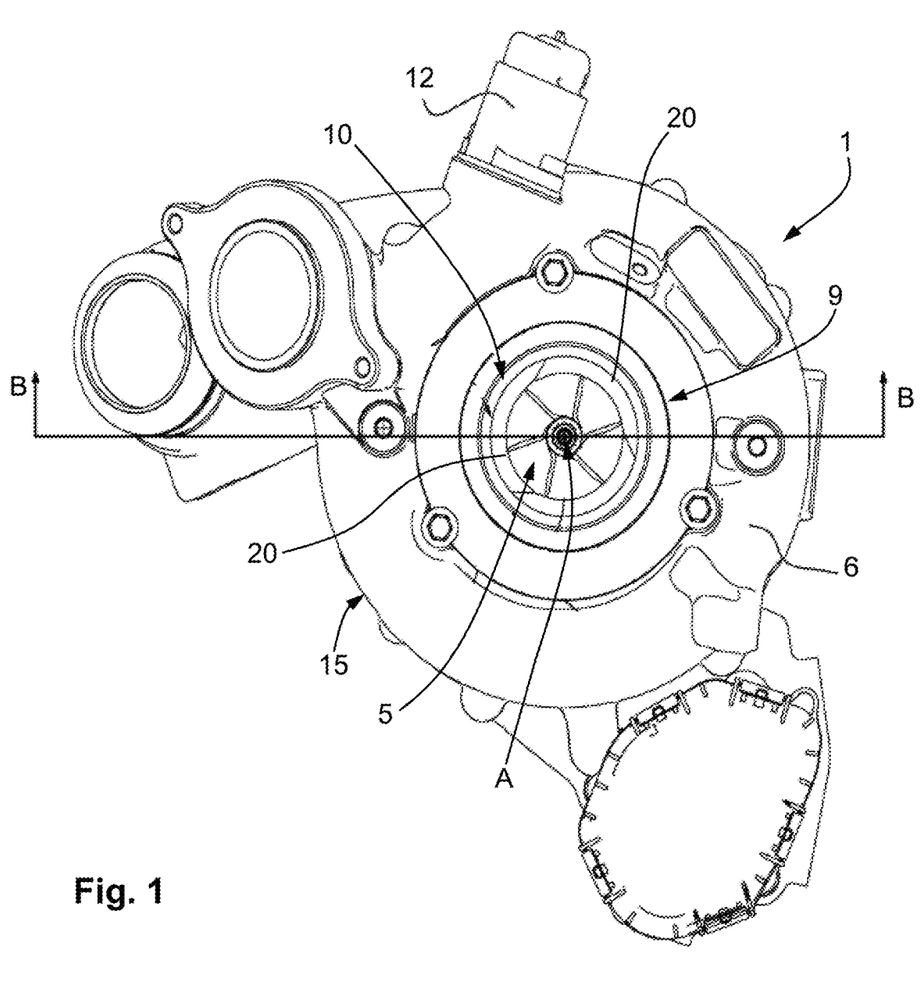
FIG. 1 shows a top view of an embodiment of the turbocharger according to the invention, looking at the compressor wheel.

FIG. 1 is a top view of an exemplary embodiment of the turbocharger 1 according to the invention, looking at a compressor wheel 5 of the turbocharger 1. In the embodiment shown, the compressor wheel 5 is positioned in an air inlet flow section 9 of the turbocharger 1. A volute 6, which is defined by a housing 15, surrounds the compressor wheel 5 and receives the compressed air from the compressor wheel 5. The compressor wheel 5 rotates about a central axis A. An actuator 12 is used to adjust the flow of air to the compressor wheel 5 by varying an inlet diameter D (see FIG. 2) of the air inlet flow section 9. With the actuator 12, the position of vanes 20 of an adjustment mechanism 10 is changed, which regulates, by varying the inlet diameter D, an inflow cross-section of air to the compressor wheel 5 of the turbocharger 1.

Figure 2:
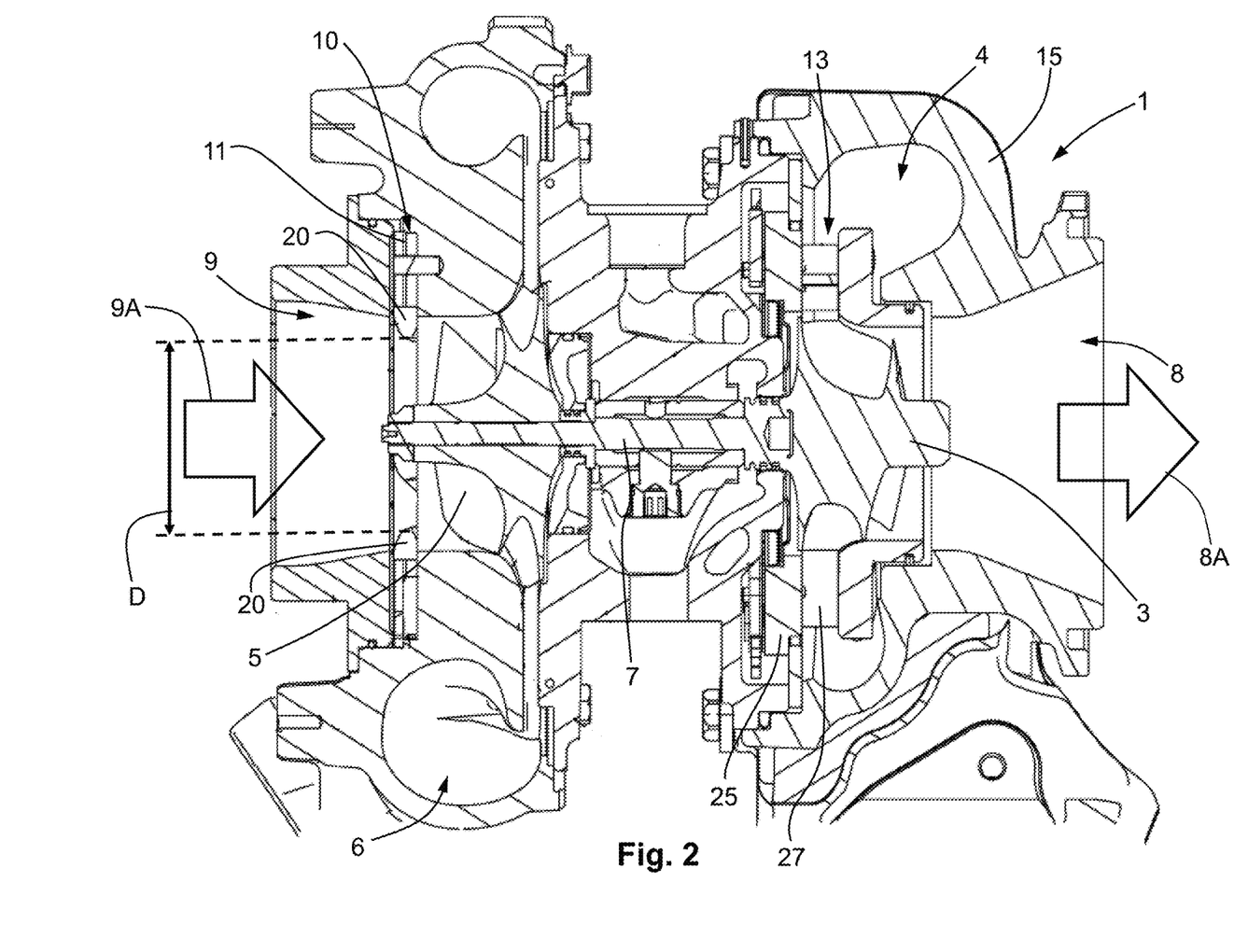
FIG. 2 is a cross-sectional view of the turbocharger taken along the cutting line B-B in FIG. 1.

FIG. 2 is a cross-sectional view of the turbocharger 1 taken along the cutting line B-B in FIG. 1. A turbine wheel 3 and the compressor wheel 5 are both mounted on a rotatable shaft 7 inside the housing 15. A volute 4, formed by the housing 15, surrounds the turbine wheel 3 in order to guide the exhaust gas to the turbine wheel 3. The exhaust gas causes a rotation of the turbine wheel 3 and via the common shaft 7 a rotation of the compressor wheel 5. An inlet 13 provides a fluid connection of the volute 4 with the turbine wheel 3. A support 25 carries movable vanes 27 in order to regulate the flow of exhaust gas from the volute 4 to the turbine wheel 3. The exhaust gas exits the turbocharger 1 via an axial exhaust flow 8A through an exhaust outlet 8.

An air inlet 9, formed by the housing 15 of the turbocharger 1, allows fresh air to reach the compressor wheel 5 via an axial air flow 9A. Prior to arriving at the compressor wheel 5, the axial air flow 9A (fresh air) has to pass an adjustment mechanism 10, which is positioned in the axial air flow 9A prior to the compressor wheel 5. The adjustment mechanism 10 has a plurality of vanes 20, which are pivotably mounted to a unison ring 11. With the movement of the vanes 20 an inlet diameter D of the air inlet 9 is adjusted. From the compressor wheel 5 the compressed air enters the volute 6, which surrounds the compressor wheel 5.

Figure 3:
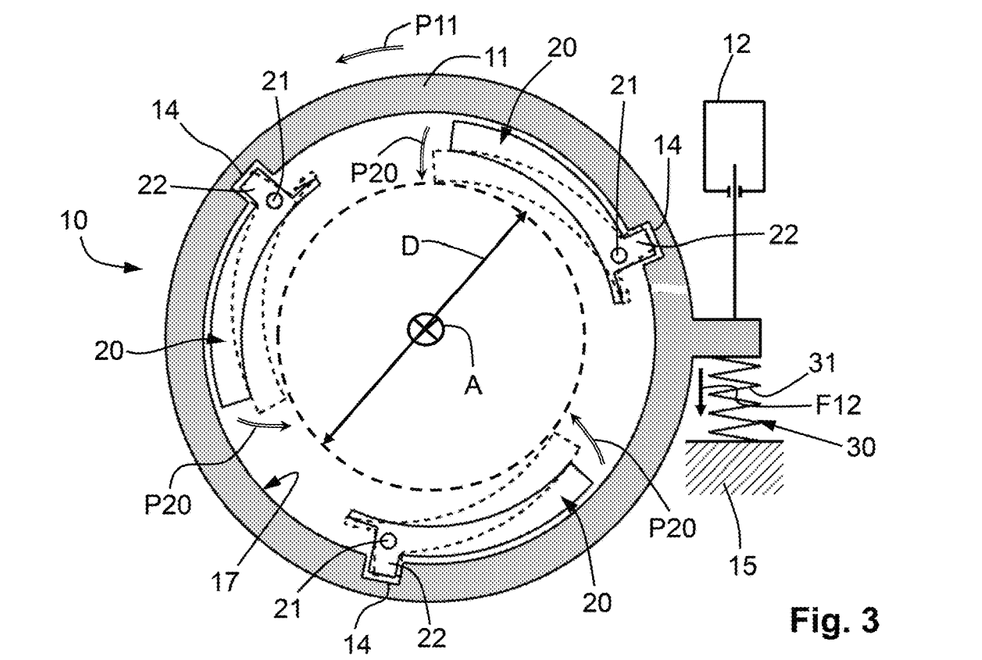
FIG. 3 shows a schematic top view of a first embodiment of an adjustment mechanism according to the invention.

An adjustment mechanism 10 is shown in a schematic top view in FIG. 3. The adjustment mechanism 10 for an air inlet flow section of the compressor wheel 5 of a turbocharger 1 (see FIG. 1 or 2) comprises the unison ring 11 and a plurality of vanes 20, which are mounted pivotable and are mechanically linked to the unison ring 11. An actuator 12 is used in order to impress a first rotating or pivoting motion P11 on the unison ring 11. The first rotating or pivoting motion P11 of the unison ring 11 causes the plurality of vanes 20 each to carry out a second pivoting motion P20 around a corresponding pivot point 21. The vanes 20, shown in dashed lines, represent the position of the vanes 20 after the first pivoting motion P11 of the unison ring 11 has been performed. The second pivoting motion P20 of the vanes 20 regulates the inlet diameter D of the axial air flow 9A of air to the compressor wheel 3 (see FIG. 2). The compressor wheel 5 rotates around the central axis A and compresses the air.

In the embodiment and as shown in FIG. 3, each vane 20 has a nose 22 which reaches in and or engages with a corresponding recess 14 of the unison ring 11 to effect the second pivoting motion P20 of the vanes 20. The recesses 14 are formed at an inner circumference 17 of the unison ring 11. Due to the at least one nose 22, the first pivoting motion P11 of the unison ring 11 causes the pivoting motion P20 of the vanes 20.

As shown in FIG. 3, at least one elastic biaser 30 is attached to the unison ring 11 and the housing 15 of the turbocharger 1. Upon operation of the actuator 12, the biaser 30 causes a restoring force F12. The restoring force F12 causes the unison ring 11 to pivot in the opposite direction of the first pivoting motion P11, which, in the event of failure of the actuator 12, returns the vanes 20 back into the initial position (solid lines). Preferably, the at least one elastic biaser 30 is a spring, e.g., a first spring element 31.

Figure 4:
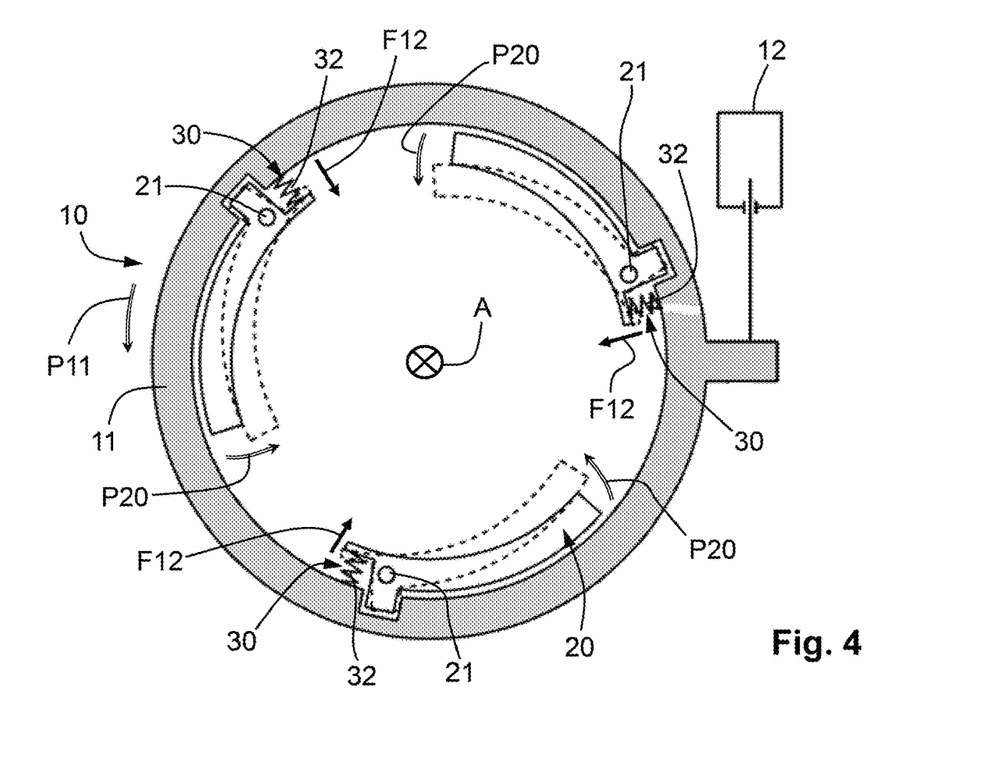
FIG. 4 shows a schematic top view of a second embodiment of an adjustment mechanism according to the invention.

FIG. 4 shows a schematic top view of a second embodiment of the adjustment mechanism 10 according to the present invention. The difference to the embodiment as shown in FIG. 3 is that at least one elastic biaser 30 is arranged between the unison ring 11 and each of the plurality of vanes 20. There is no elastic biaser 30 arranged between the unison ring 11 and the housing 15 of the turbocharger 1. As mentioned in the description of FIG. 3, the actuator 12 impresses a first rotating or pivoting motion P11 on the unison ring 11. The first rotating or pivoting motion P11 of the unison ring 11 causes the plurality of vanes 20 to carry out the second pivoting motion P20 around the pivot point 21. The respective nose 22 of each vane 20, which reaches in and/or engages with a corresponding recess 14 of the unison ring 11, causes the second pivoting motion P20 of the vanes 20. Due to the second pivoting motion P20 of the vanes 20, the at least one elastic biaser 30 between the unison ring 11 and each vane 20 is biased and causes a restoring force F12. The sum of the restoring forces F12 is sufficiently large that the unison ring 11 can be moved back into the initial position, if, for example, the actuator 12 fails during operation. Preferably, the at least one elastic biaser, between the unison ring 11 and each vane 20 of the adjustment mechanism 10, is a spring, e.g., second spring element 32.

Figure 5:
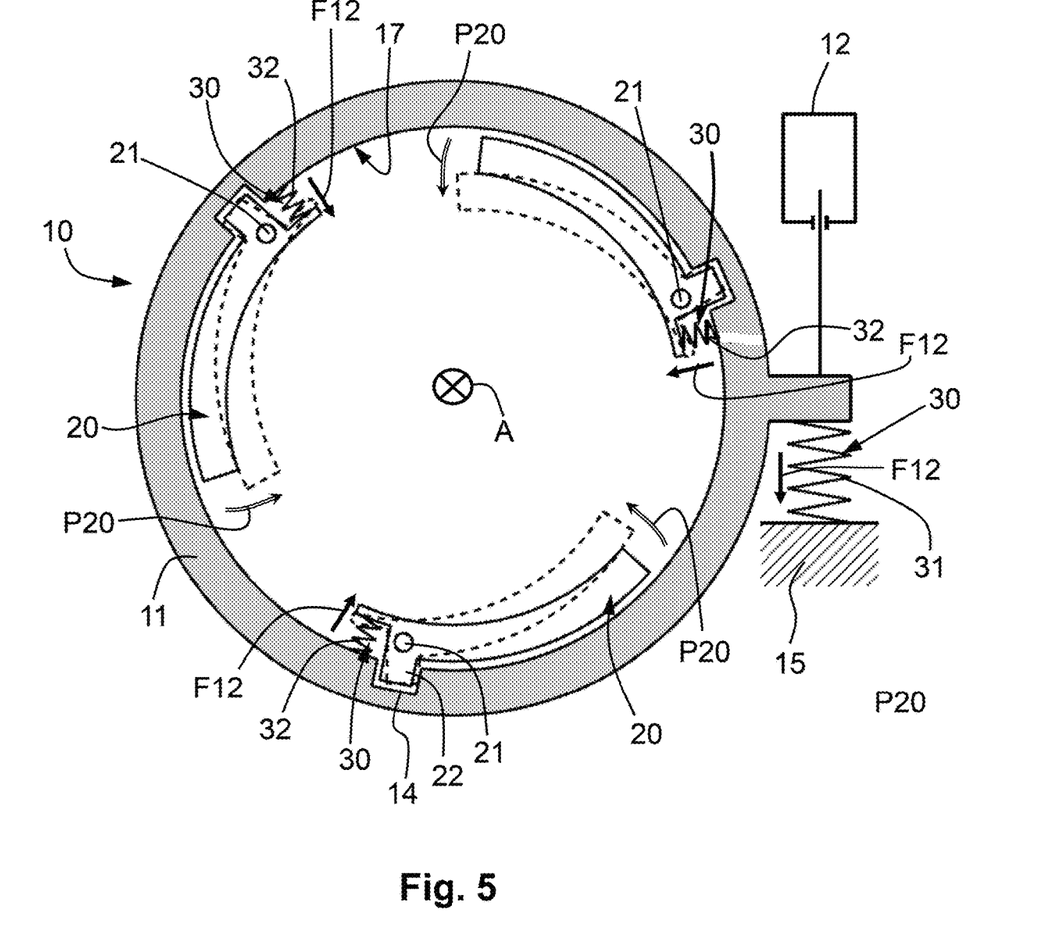
FIG. 5 shows a schematic top view of a third embodiment of an adjustment mechanism according to the invention.

FIG. 5 shows a schematic top view of a third embodiment of the adjustment mechanism 10 according to the invention. Here, the at least one elastic biaser 30 is attached to the unison ring 11 and the housing 15 of the turbocharger 1, and at least one elastic biaser 30 is arranged between the unison ring 11 and each of the plurality of vanes 20. The at least one elastic biaser 30 between the unison ring 11 and the housing 15 and the at least one elastic biaser 30 between each vane 10 and the unison ring 11 provide a common restoring force F12. The common restoring force F12 is sufficiently large that the unison ring 11 can be moved back into the initial position, if, for example, the actuator 12 fails during operation. Preferably, the at least one elastic biaser, between the unison ring 11 and each vane 20 of the adjustment mechanism 10, is a second spring element 32, and the at least one elastic biaser 30 between the unison ring 11 and the housing or the turbocharger 1 is a first spring element 31.

The description of FIGS. 3 to 5 show three vanes 20 which are part of the embodiment of the adjustment mechanism 10 according to the invention. However, the number of vanes 20 is used for descriptive purposes only and should not be construed as a limitation of the invention. It obvious to a skilled person that any number of more than two vanes can be used to practice the invention.

Figure 6:
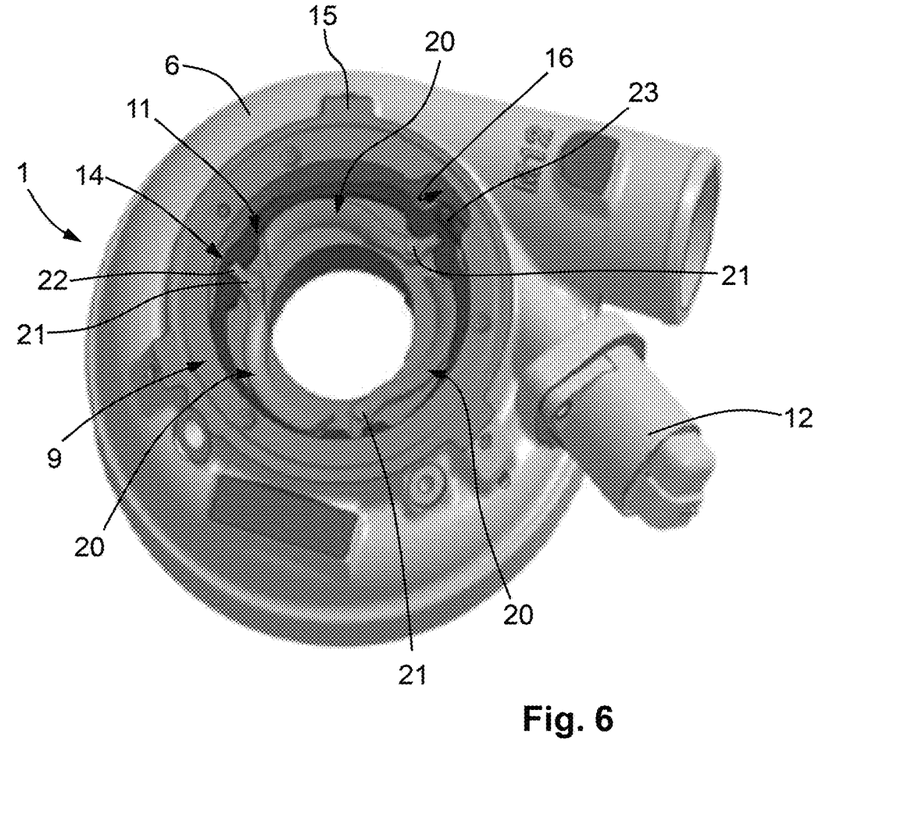
FIG. 6 shows a perspective view of a housing part of the turbocharger according an embodiment of the invention, wherein the adjustment mechanism is positioned in the axial direction prior to the compressor wheel of the turbocharger.

FIG. 6 shows a perspective view of a housing 15 part of the turbocharger 1 according an embodiment of the invention, wherein the adjustment mechanism 10 is arranged prior to the compressor wheel 5 (not shown here) in the air inlet flow section 9 of the turbocharger 1. The actuator 12 is mounted to the housing 15 of the turbocharger 1. A link 23 connects the actuator 12 to the unison ring 11. A recess 16 is formed in the housing 15 in order to provide space for the movement of the connection of the link 23 and the unison ring 11. The adjustment mechanism 10 is surrounded by the housing 15 and, upon action of the actuator 12, carries out the first pivoting motion P11 (for example see FIG. 3). The each vane 20 is pivotably mounted about a corresponding pivot point 21 to the housing 15 of the turbocharger 1. As mentioned in the description of FIGS. 3 to 5, a nose 22 of each vane 20 cooperates with a respective recess 14 of the unison ring 11. A volute 6 surrounds the compressor wheel 5 (nor shown here) to receive the compressed air. The form of the vanes 20 is designed such that they are in line with the aerodynamic requirements within the air inlet flow section 9 of the turbocharger 1 to effectively guide and concentrate the axial air flow 9a to the compressor wheel 5.

Figure 7:
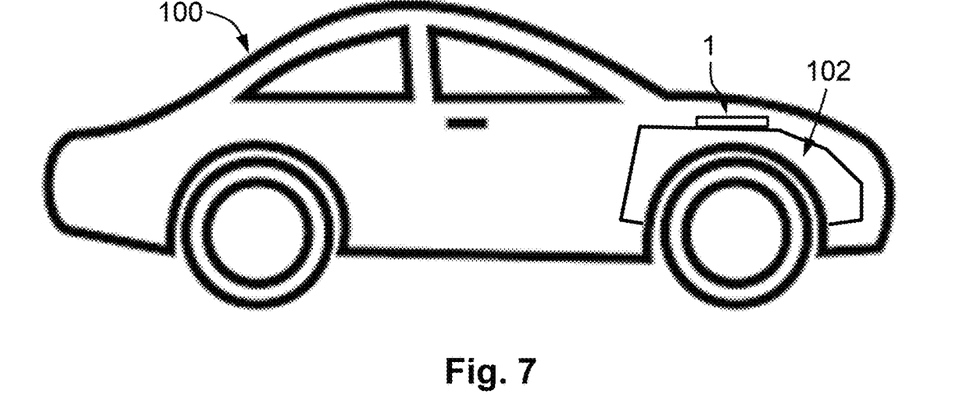
FIG. 7 is a schematic side view of a motor vehicle using an embodiment of the turbo charger according to the invention.

FIG. 7 is a schematic side view of a motor vehicle 100 using an embodiment of the turbocharger 1 according to the invention. The motor vehicle 100 has an internal combustion engine 102 which is equipped with any embodiment of the turbocharger 1 according to the invention. The turbocharger 1 according to the invention provides a fail-safe function, which still allows a safe driving in case of a malfunction of the turbocharger 1. The vanes 20 in the exhaust part of the turbocharger 1 are moved to an initial position at the occurrence of the malfunction.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An adjustment mechanism for an inlet flow section of a compressor wheel of a turbocharger for defining a variable inlet diameter for an axial air flow to the compressor wheel, the adjustment mechanism comprising:
   an unison ring arranged in the air inlet flow section prior to the compressor wheel in a direction of the axial air flow;
   a plurality of vanes being pivotably mounted and mechanically linked to the unison ring;
   an actuator for providing a first pivoting motion to the unison ring about a central axis and thereby providing a second pivoting motion to the plurality of vanes which set the variable inlet diameter; and
   at least one elastic biaser arranged between the unison ring and at least one of the plurality of vanes such that the elastic biaser provides, upon the first pivoting motion to the unison ring, a restoring force to the unison ring and the at least one of the plurality of vanes.

2. The adjustment mechanism as claimed in claim 1, wherein the at least one elastic biaser arranged between the unison ring and each of the plurality of vanes is a second spring element.

3. The adjustment mechanism as claimed in claim 1, wherein the at least one elastic biaser is attached to the unison ring and the housing of the turbocharger, and at least one of the at least one elastic biaser is arranged between the unison ring and each of the plurality of vanes.

4. The adjustment mechanism as claimed in claim 3, wherein the at least one elastic biaser attached to the unison ring and the housing is at least one first spring element and the at least one elastic biaser arranged between the unison ring and each of the plurality of vanes is at least one second spring element.

5. The adjustment mechanism as claimed in claim 1, wherein each vane is mounted pivotably about a pivot point and mechanically linked to an inner circumference of the unison ring.

6. The adjustment mechanism as claimed in claim 5, wherein the mechanical link is provided by a nose of each vane, wherein each nose reaches in a corresponding recess formed at an inner circumference of the unison ring.

7. The adjustment mechanism according to claim 4, wherein the first spring element and/or the second spring element is a spring adapted to be compressed.

8. A turbocharger comprising the adjustment mechanism as claimed in claim 1.

9. A vehicle comprising:
   an internal combustion engine; and
   a turbocharger comprising the adjustment mechanism as claimed in claim 1.

* * * * *